(12) United States Patent
Katz et al.

(10) Patent No.: US 12,253,826 B1
(45) Date of Patent: Mar. 18, 2025

(54) CONFIGURING HOLOGRAM INTERACTIONS WITH VEHICLE PASSENGERS

(71) Applicant: UIPCO, LLC, San Antonio, TX (US)

(72) Inventors: Brian Howard Katz, San Antonio, TX (US); Jon Dwain McLaughlin, Syracuse, NY (US); Surender Kumar, Palatine, IL (US); Roberto Virgillio Jolliffe, San Antonio, TX (US); Shayla Leigh Callis, Simi Valley, CA (US); Sydney Ann Conrad-Cook, Van Meter, IA (US); Breanna Nicole Allerkamp, Boerne, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 275 days.

(21) Appl. No.: 17/684,596

(22) Filed: Mar. 2, 2022

(51) Int. Cl.
 *G03H 1/00* (2006.01)
 *B60K 35/00* (2006.01)
 (Continued)

(52) U.S. Cl.
 CPC ........... *G03H 1/0005* (2013.01); *B60K 35/00* (2013.01); *B60N 2/0276* (2013.01); *E05F 15/72* (2015.01);
 (Continued)

(58) Field of Classification Search
 CPC ......... G03H 1/0005; G03H 2001/0061; B60K 35/00; B60K 35/28; B60K 2360/161;
 (Continued)

(56) References Cited

U.S. PATENT DOCUMENTS

| 6,853,849 B1 | 2/2005 | Tognazzini |
| 9,773,281 B1 | 9/2017 | Hanson |

(Continued)

FOREIGN PATENT DOCUMENTS

| DE | 102015209853 A1 * | 12/2016 |
| JP | 6940612 B2 | 9/2021 |

OTHER PUBLICATIONS

DE102015209853 (A1) EPO machine translation (Year: 2016).*

*Primary Examiner* — Yuen Wong
(74) *Attorney, Agent, or Firm* — Potomac Law Group, PLLC; Dannon G. Allbee

(57) ABSTRACT

Implementations configure hologram interactions with vehicle passengers. A hologram manager can configure a hologram to interact with vehicle passengers, alleviate danger, and/or guide vehicle passengers to safety. The hologram manager can select an input modality for the hologram according to sensed conditions. For example, the hologram manager can determine a state of impairment for a passenger using sensed data and machine learning model(s). The hologram manager can then select an input modality according to the state of impairment. The generated hologram can be configured by the hologram manager to interact with the passenger using the selected input modality. For example, an instruction manager can generate a set of instructions using sensed and/or gathered information, and the hologram manager can configure the hologram to provide the instructions to the passenger using the input modality.

19 Claims, 10 Drawing Sheets

(51) Int. Cl.
  *B60N 2/02* (2006.01)
  *E05F 15/72* (2015.01)
  *B60K 35/28* (2024.01)
  *B62D 1/18* (2006.01)
  *G06F 3/01* (2006.01)
  *G06F 3/16* (2006.01)

(52) U.S. Cl.
  CPC ........ *B60K 35/28* (2024.01); *B60K 2360/161* (2024.01); *B60K 2360/29* (2024.01); *B62D 1/18* (2013.01); *E05Y 2400/45* (2013.01); *E05Y 2400/85* (2013.01); *E05Y 2800/252* (2013.01); *E05Y 2900/531* (2013.01); *E05Y 2900/548* (2013.01); *E05Y 2900/55* (2013.01); *G03H 2001/0061* (2013.01); *G06F 3/013* (2013.01); *G06F 3/017* (2013.01); *G06F 3/167* (2013.01)

(58) Field of Classification Search
  CPC ... B60K 2360/29; B60N 2/0276; E05F 15/72; B62D 1/18; E05Y 2400/45; E05Y 2400/85; E05Y 2800/252; E05Y 2900/531; E05Y 2900/548; E05Y 2900/55; G06F 3/013; G06F 3/017; G06F 3/167
  See application file for complete search history.

(56) References Cited

U.S. PATENT DOCUMENTS

| | | |
|---|---|---|
| 9,886,841 B1 | 2/2018 | Nave et al. |
| 10,086,782 B1 | 10/2018 | Konrardy et al. |
| 10,106,156 B1 | 10/2018 | Nave et al. |
| 10,360,742 B1 | 7/2019 | Bellas et al. |
| 10,580,306 B1 | 3/2020 | Harris et al. |
| 10,586,122 B1 | 3/2020 | Gingrich et al. |
| 10,660,806 B1 | 5/2020 | Nelson-Herron et al. |
| 10,692,149 B1 | 6/2020 | Loo et al. |
| 10,769,456 B2 | 9/2020 | Sathyanarayana et al. |
| 10,789,650 B1 | 9/2020 | Nave et al. |
| 10,803,527 B1 | 10/2020 | Zankat et al. |
| 10,853,882 B1 | 12/2020 | Leise et al. |
| 10,867,495 B1 | 12/2020 | Venetianer et al. |
| 11,379,886 B1 | 7/2022 | Fields et al. |
| 11,669,590 B2 | 6/2023 | Hyland et al. |
| 11,679,763 B2 | 6/2023 | Nagasawa |
| 11,781,883 B1 | 10/2023 | Dabell |
| 2011/0117878 A1 | 5/2011 | Barash et al. |
| 2014/0379523 A1 | 12/2014 | Park |
| 2015/0084757 A1 | 3/2015 | Annibale et al. |
| 2015/0145695 A1 | 5/2015 | Hyde et al. |
| 2016/0009279 A1 | 1/2016 | Jimaa et al. |
| 2016/0169688 A1 | 6/2016 | Kweon et al. |
| 2017/0053461 A1 | 2/2017 | Pal et al. |
| 2017/0072850 A1 | 3/2017 | Curtis et al. |
| 2017/0213462 A1 | 7/2017 | Prokhorov |
| 2017/0248949 A1 | 8/2017 | Moran et al. |
| 2017/0248950 A1 | 8/2017 | Moran et al. |
| 2018/0061253 A1 | 3/2018 | Hyun |
| 2018/0286248 A1 | 10/2018 | Choi et al. |
| 2018/0293864 A1 | 10/2018 | Wedig et al. |
| 2018/0297593 A1 | 10/2018 | Pitale et al. |
| 2018/0300964 A1 | 10/2018 | Lakshamanan et al. |
| 2018/0308342 A1 | 10/2018 | Hodge |
| 2018/0364722 A1 | 12/2018 | Schlesinger et al. |
| 2019/0095877 A1 | 3/2019 | Li |
| 2019/0174289 A1 | 6/2019 | Martin et al. |
| 2019/0202448 A1 | 7/2019 | Pal et al. |
| 2019/0253861 A1 | 8/2019 | Horelik et al. |
| 2019/0327597 A1 | 10/2019 | Katz et al. |
| 2019/0385457 A1 | 12/2019 | Kim et al. |
| 2020/0043097 A1 | 2/2020 | Aznaurashvili et al. |
| 2020/0059776 A1 | 2/2020 | Martin et al. |
| 2020/0105120 A1 | 4/2020 | Werner et al. |
| 2020/0274962 A1 | 8/2020 | Martin et al. |
| 2021/0023946 A1* | 1/2021 | Johnson ................. G06F 1/1639 |
| 2021/0027409 A1 | 1/2021 | Nair et al. |
| 2021/0219257 A1 | 7/2021 | Anand et al. |
| 2021/0304593 A1 | 9/2021 | Matus et al. |
| 2022/0063609 A1 | 3/2022 | Nagasawa |
| 2022/0095975 A1* | 3/2022 | Aluf .................. B60W 60/0051 |
| 2022/0321343 A1 | 10/2022 | Bahrami et al. |
| 2022/0383256 A1 | 12/2022 | Roh et al. |
| 2023/0169845 A1 | 6/2023 | Turner et al. |
| 2023/0242099 A1 | 8/2023 | Pishehvari et al. |
| 2023/0298468 A1 | 9/2023 | Jha et al. |

* cited by examiner

CONFIGURING HOLOGRAM INTERACTIONS WITH VEHICLE PASSENGERS

TECHNICAL FIELD

The present disclosure is directed to configuring hologram interactions with vehicle passengers.

BACKGROUND

A portion of the population is impacted by vehicle related incidents every year. Unsafe vehicle operation or accidents cause personal injury and property damage. Some techniques have been explored to mitigate vehicle related risk, such as warning systems (e.g., lane warning, brake warning) and even self-driving technology. However, these systems remain limited in functionality, impractical, costly, and/or ineffective. Techniques that reduce driving related incidents and improve the aftermath of such incidents can provide substantial social benefit.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1A:
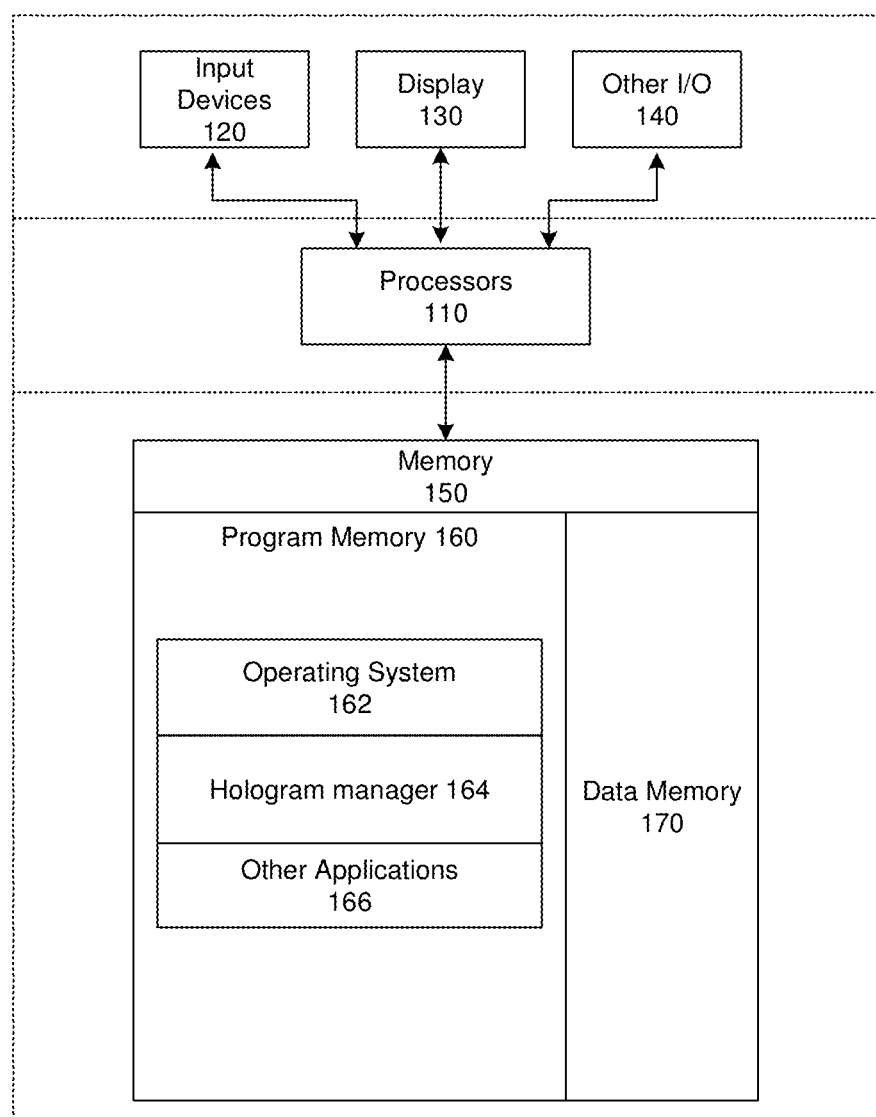
FIGS. 1A-1C are block diagrams illustrating an overview of devices on which some implementations can operate.

Aspects of the present disclosure are directed to a hologram manager that can provide hologram interactions with vehicle passenger(s). For example, vehicle operation can present dangerous conditions for vehicle passengers (e.g., a driver and/or passengers). Passengers can benefit from guidance and/or intervention during, before, or after unsafe vehicle or passenger conditions. Implementations configure hologram interactions with vehicle passengers to alleviate unsafe conditions. For example, the hologram manager can configure a hologram to interact with vehicle passengers to gather information, alleviate danger, guide vehicle passengers to safety, or a combination thereof.

The hologram manager can select an input modality for the hologram according to sensed conditions. For example, sensors gather data representative of vehicle conditions and/or passenger conditions. The hologram manager can determine a state of impairment for a passenger using the sensed data and select an input modality according to the state of impairment. For example, the hologram manager can select the input modality to match communication capabilities for the state of impairment of the passenger. The selected input modality can be one or more of audio, movement or gesture, gaze, or a combination thereof. The hologram manager configures the generated hologram to interact with the passenger using the selected input modality and the hologram manager can control the hologram based on the input.

Implementations prompt the passenger to provide input using the selected input modality. After a wait period, if the passenger fails to provide input using the selected input modality, the hologram can prompt the passenger to provide input using a different input modality. The hologram manager can then select the different input modality for further interaction when the passenger provides input using the different modality.

In some implementations, the generated hologram gathers condition information from the passenger using the selected input modality. Example condition information includes passenger health information, vehicle information, safety information from surrounding conditions, or a combination thereof. Once the condition information is gathered, an instruction manager compiles instructions for the passenger in some implementations. For example, stored instruction templates can have parameters for incident type (e.g., crash type), passenger condition, vehicle condition, surrounding safety conditions, or other suitable conditions. The instruction manager selects instruction templates that match the current incident type, passenger health information, vehicle information, and/or safety information for surrounding conditions.

For example, after a crash if a vehicle remains in the middle of an intersection it may be urgent for a passenger to leave the vehicle to avoid another crash. The information sensed by sensor device(s) and/or gathered by the hologram (e.g., through interactions with the passenger) can be used to determine that: incident type is a crash; passenger impairment is dazed, mobile, and non-injured; vehicle condition is undriveable, no imminent danger (e.g., danger of explosion), and driver-side door damaged; and surrounding conditions are in traffic. The instruction manager can match this information to an instruction template with parameters that match: unsafe surrounding conditions, non-injured passengers, undriveable vehicle, and after a crash. The matched instruction template can include instructions for safely leaving a vehicle after a crash. The instruction manager generates instructions for the current conditions by applying the sensed/gathered information to the instruction template. For example, the instruction manager can generate instructions to guide the passenger out of a door that is not the driver side door given the known damage.

In some implementations, after a crash the hologram manager can interact with the passenger (e.g., using the selected input modality) to gather health information about the passenger. For example, the passenger may be pinned after the crash in the driver-side seat, and the passenger can communicate this information to the hologram manager. The information sensed by sensor device(s) and/or gathered by the hologram manager (e.g., through interactions with the passenger) can be used to determine that: incident type is crash; passenger impairment is dazed, pinned to driver-side seat, and non-injured; vehicle condition is drivable with limited damage and no imminent danger (e.g., danger of explosion); and surrounding conditions are safe. This information can be compared to intervention rules that configure intervention actions in some implementations. An example intervention rule definition includes: IF passenger is pinned AND passenger is non-injured AND passenger is in a front seat, THEN move occupied seat to release passenger. Implementations may interact with the passenger using the hologram manager (and selected input modality) to request permission to move the driver seat. When the passenger gives permission, a device controller can transmit an instruction to the vehicle, a seat controller, or any other suitable device capable of moving the driver seat based on electronic instruction.

Implementations can mix providing instructions and performing intervention actions. In the above example of a pinned driver, the instruction manager can select instruction templates and apply the known information to generate instructions for the passenger to resolve the pinned status. For example, an instruction template can include a list of options for freeing the passenger, such as remove your seatbelt, move your seat, move the steering wheel, check clothing items to ensure they are not restricting movement, and other suitable options. The hologram can interact with the passenger to guide the passenger through these options. The intervention rules may indicate that intervention action should be performed after instruction, as it would be preferred for the passenger be freed without intervention action. When the instruction is completed without the passenger being freed, the intervention action can be performed.

In some implementations, sensor data can be used to detect a driver incapacitation, such as during vehicle operation. For example, camera(s) can capture the driver's condition and a model (e.g., machine learning model) configured to detect one or more types of incapacitation (e.g., sleep, heart attack, stroke, full or partial paralysis, unconsciousness, not paying attention to the road, or other suitable incapacitation) can be used to analyze the captured data. The hologram manager can configure a hologram to interact with the driver to safely maneuver and/or stop the vehicle. For example, the hologram manager can select an input modality according to the incapacitation detected for the driver. Using the input modality to communicate, the hologram manager receive vehicle operation instructions from the driver. For example, the hologram manager can receive, using the selected input modality, steering instructions, stopping instructions, or any other suitable vehicle operation instructions and provide feedback and instructions to the user via various holograms. A device controller transmits an instruction to the vehicle to cause the vehicle to perform the operation (e.g., to safely stop the vehicle).

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Conventional vehicle assistance systems possess limited functionality and fail to generate a practical interaction with passengers. For example, warning systems (e.g., lane warning, brake warning) can detect and implement mitigation techniques to improve vehicle safety, however these conventional systems fail to utilize driver condition. In addition, the mitigation techniques are limited to warnings or interventions such as automatic braking. Self-driving car technology can theoretically improve safety, however the technology has failed to generate consistently safe results.

Implementations improve vehicle and passenger safety with specific assistance that is tailored to resolved conditions for the vehicle and state information for the driver/passengers. For example, sensor(s) data, machine learning model(s), and immersive interactions with a hologram can be used to gather detailed information about the vehicle, passengers, incident types, and surrounding conditions. Assistance in the form of instructions or intervening action tailored to the unique circumstances for a vehicle, passenger, and or incident type (e.g., crash type) is provided. Because the assistance is specific to the current conditions, the likelihood of improving safety outcomes is dramatically increased.

In addition, holograms are used to provide passengers an immersive experience and aid in instruction compliance. A passenger after a crash may be dazed and disoriented. Providing assistance with a hologram can improve clarity for the passenger, increase reaction times, and improve safety outcomes. Some implementations utilize a three-dimensional mapping, for example of the interior of the vehicle. This three-dimensional mapping supports hologram movement within the mapping such that the displayed hologram can communicate instructions with high degrees of clarity.

Several implementations are discussed below in more detail in reference to the figures. FIG. 1A is a block diagram illustrating an overview of devices on which some implementations of the disclosed technology can operate. The devices can comprise hardware components of a device 100 that configure hologram interactions for a vehicle passenger. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 1B and 1C. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, hologram manager 164, and other application programs 166. Memory 150 can also include data memory 170, e.g., sensor data, language data, instruction templates, compiled instructions, intervention rules, training data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 1B:
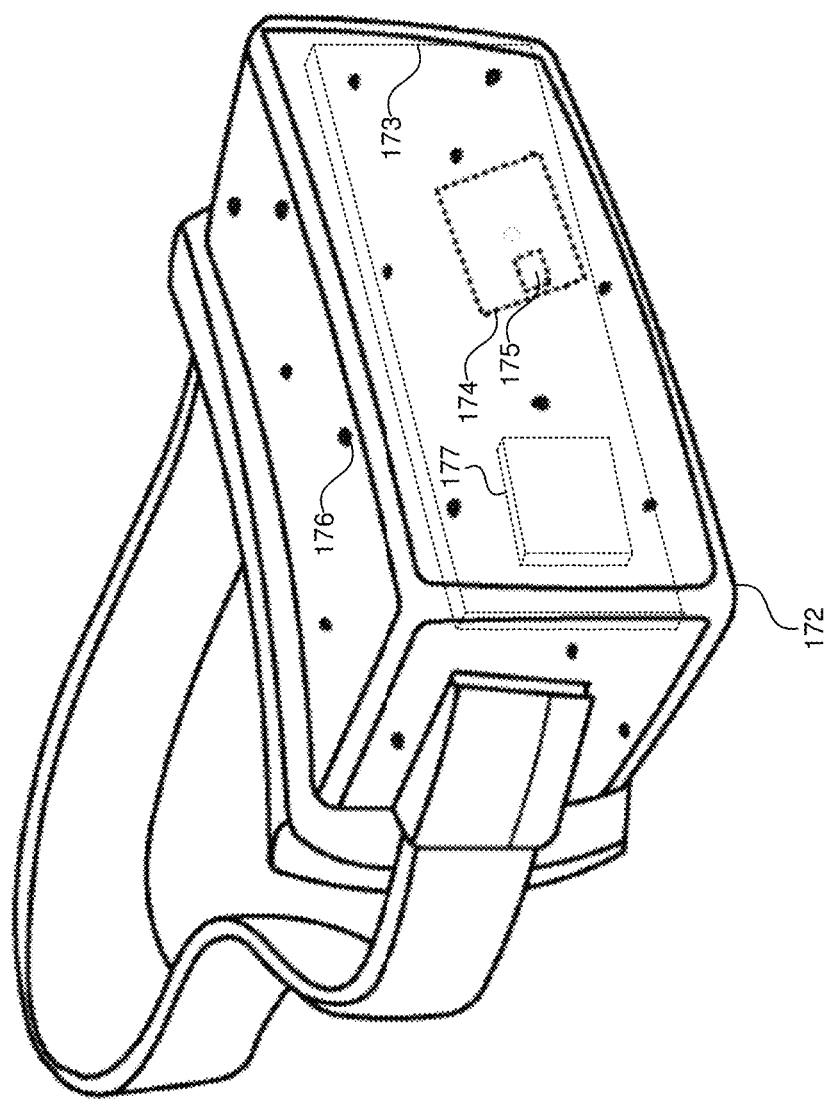

FIG. 1B is a wire diagram of a virtual reality head-mounted display (HMD) 171, in accordance with some embodiments. The HMD 171 includes a front rigid body 172. The front rigid body 172 includes one or more electronic display elements of an electronic display 173, an inertial motion unit (IMU) 174, one or more position sensors 175, locators 176, and one or more compute units 177. The position sensors 175, the IMU 174, and compute units 177 may be internal to the HMD 171 and may not be visible to the user. In various implementations, the IMU 174, position sensors 175, and locators 176 can track movement and location of the HMD 171 in the real world and in an artificial reality environment in three degrees of freedom (3DoF) or six degrees of freedom (6DoF). For example, the locators 176 can emit infrared light beams which create light points on real objects around the HMD 171. As another example, the IMU 174 can include e.g., one or more accelerometers, gyroscopes, magnetometers, other non-camera-based position, force, or orientation sensors, or combinations thereof. One or more cameras (not shown) integrated with the HMD 171 can detect the light points. Compute units 177 in the HMD 171 can use the detected light points to extrapolate position and movement of the HMD 171 as well as to identify the shape and position of the real objects surrounding the HMD 171.

The electronic display 173 can be integrated with the front rigid body 172 and can provide image light to a user as dictated by the compute units 177. In various embodiments, the electronic display 173 can be a single electronic display or multiple electronic displays (e.g., a display for each user eye). Examples of the electronic display 173 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 171 can be coupled to a core processing component such as a personal computer (PC) (not shown) and/or one or more external sensors (not shown). The external sensors can monitor the HMD 171 (e.g., via light emitted from the HMD 171) which the PC can use, in combination with output from the IMU 174 and position sensors 175, to determine the location and movement of the HMD 171.

Figure 1C:
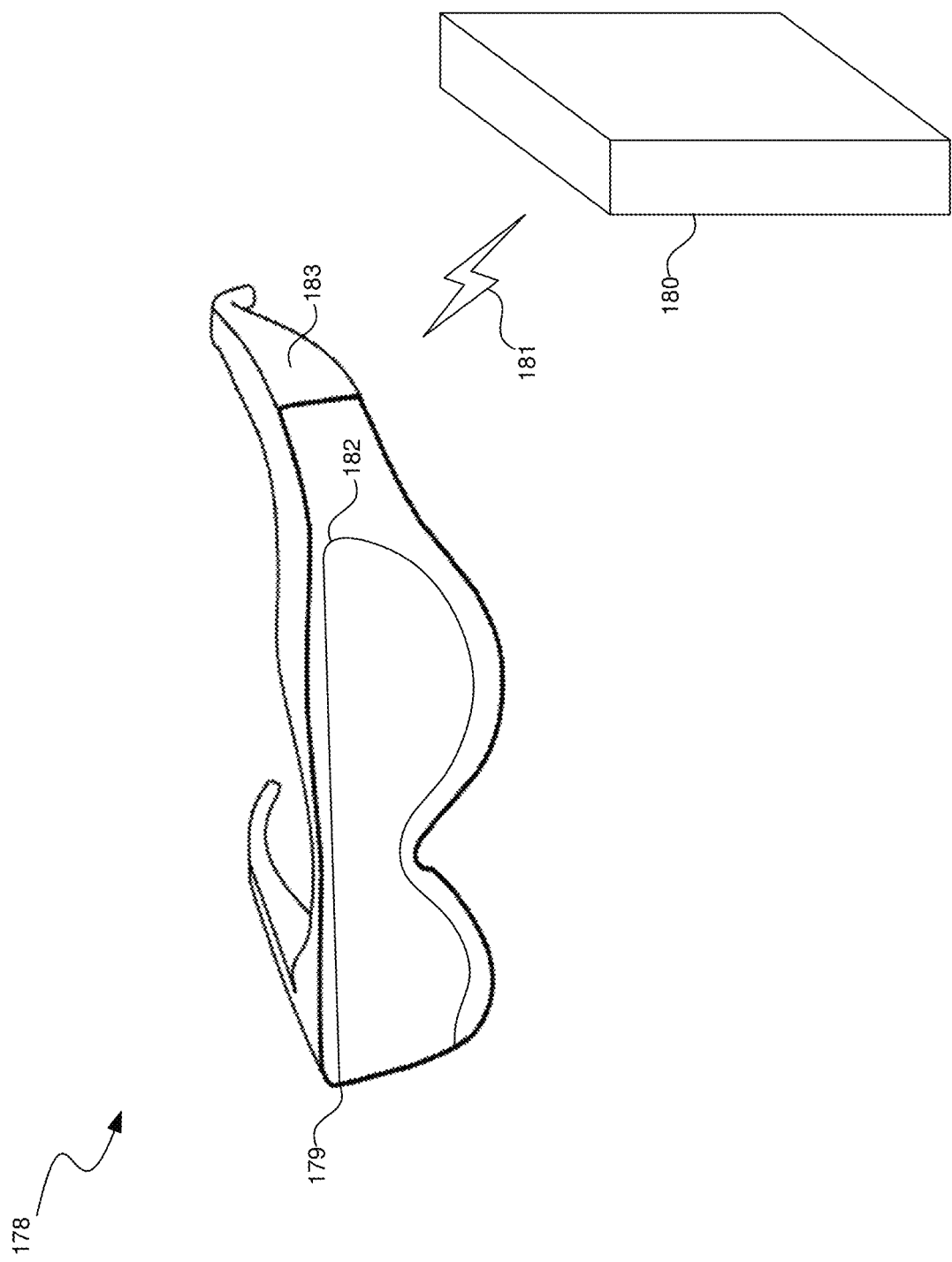

FIG. 1C is a wire diagram of a mixed reality HMD system 178 which includes a mixed reality HMD 179 and a core processing component 180. The mixed reality HMD 179 and the core processing component 180 can communicate via a wireless connection (e.g., a 60 GHz link) as indicated by link 181. In other implementations, the mixed reality system 178 includes a headset only, without an external compute device or includes other wired or wireless connections between the mixed reality HMD 179 and the core processing component 180. The mixed reality HMD 179 includes a pass-through display 182 and a frame 183. The frame 183 can house various electronic components (not shown) such as light projectors (e.g., LASERs, LEDs, etc.), cameras, eye-tracking sensors, MEMS components, networking components, etc.

The projectors can be coupled to the pass-through display 182, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 180 via link 181 to HMD 179. Controllers in the HMD 179 can convert the image data into light pulses from the projectors, which can be transmitted via the optical elements as output light to the user's eye. The output light can mix with light that passes through the display 182, allowing the output light to present virtual objects that appear as if they exist in the real world.

Similarly to the HMD 171, the HMD system 178 can also include motion and position tracking units, cameras, light sources, etc., which allow the HMD system 178 to, e.g., track itself in 3DoF or 6DoF, track portions of the user (e.g., hands, feet, head, or other body parts), map virtual objects to appear as stationary as the HMD 179 moves, and have virtual objects react to gestures and other real-world objects.

Figure 2:
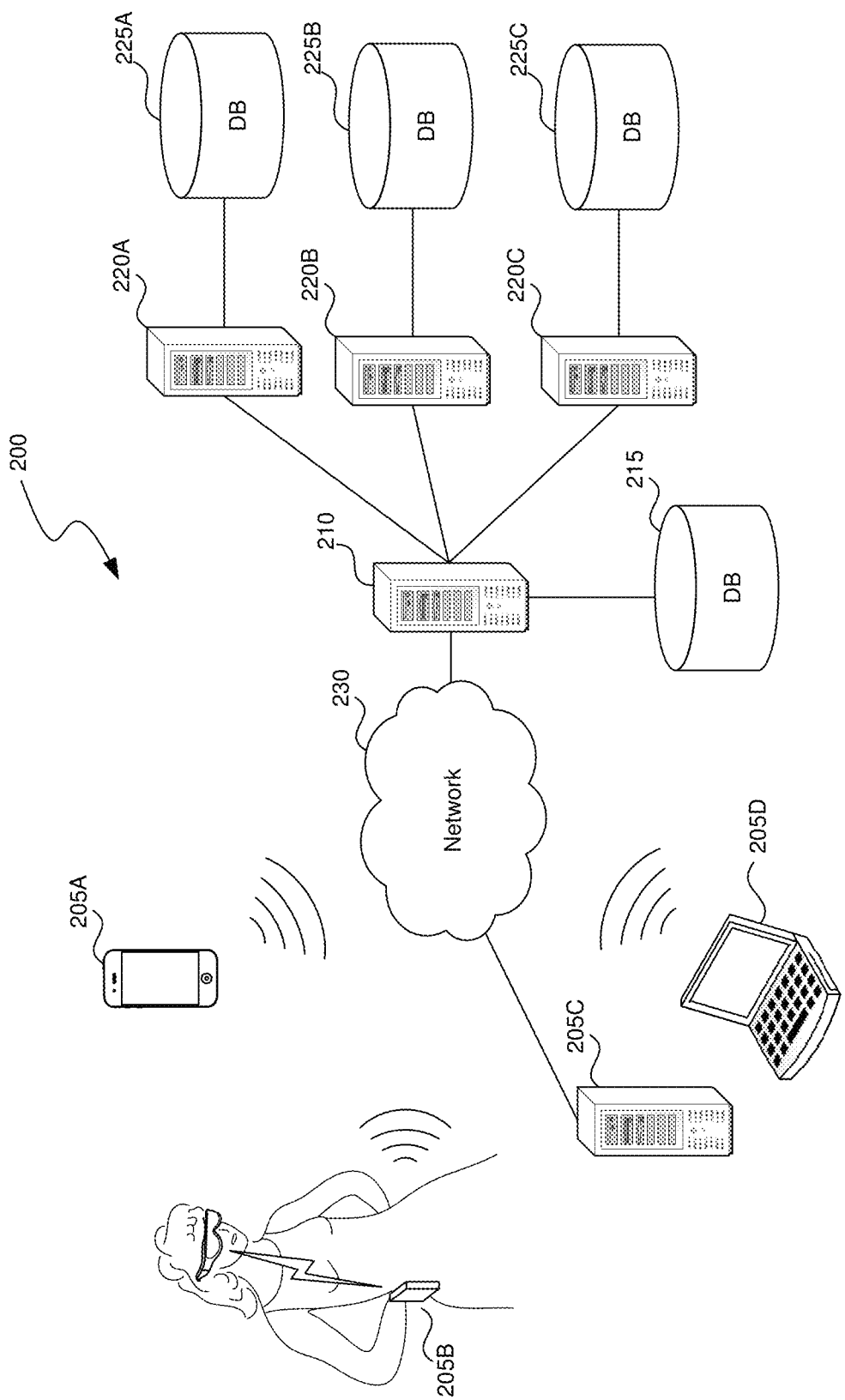
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. In some implementations, some of the client computing devices (e.g., client computing device 205B) can be the HMD 171 or the HMD system 178. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as sensor data, language data, instruction templates, compiled instructions, intervention rules, training data, configuration data, settings, user options or preferences, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
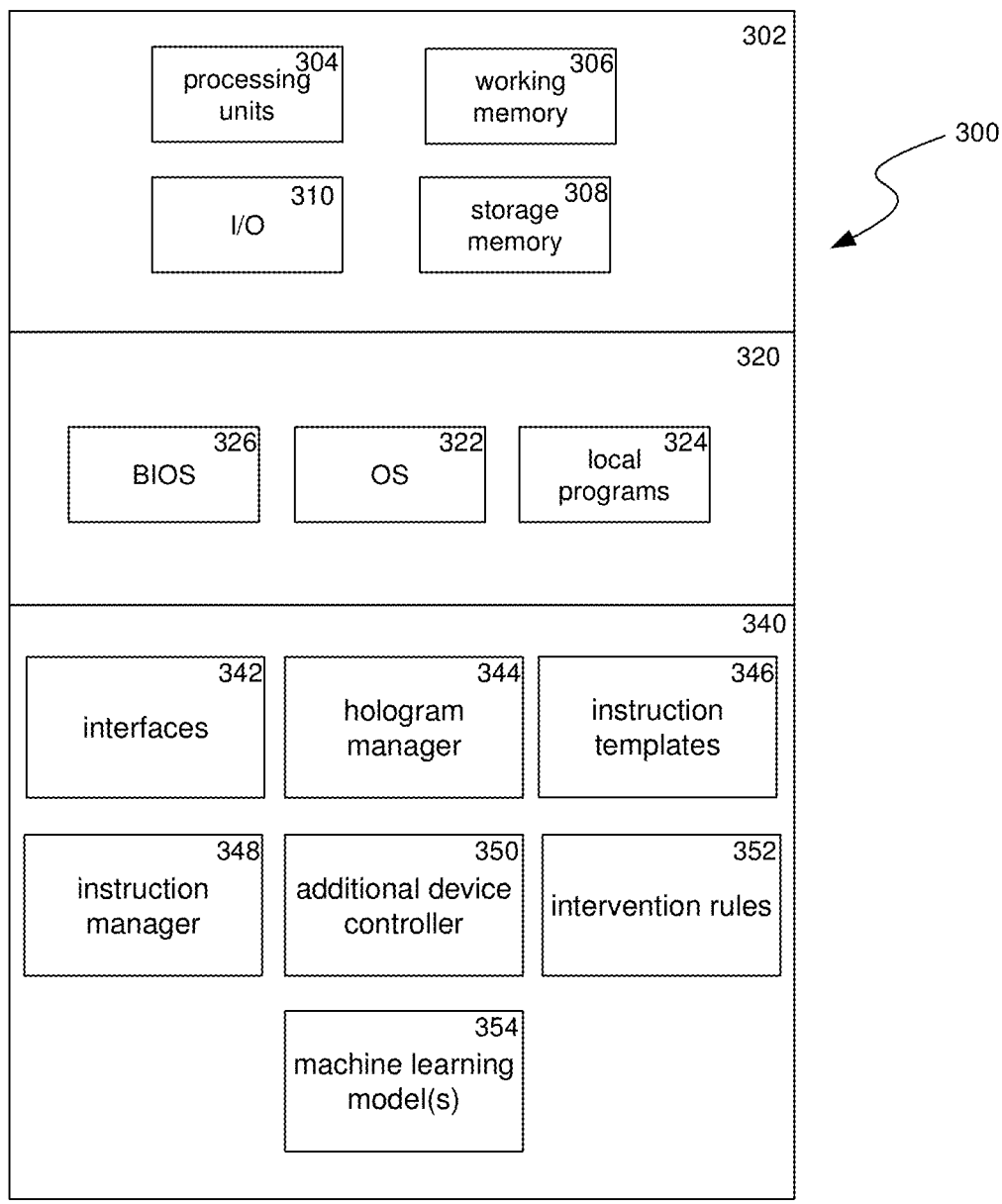
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include hologram manager 344, instruction templates 346, instruction manager 348, additional device controller 350, intervention rules 352, machine learning model(s) 354, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Hologram manager 344 configures a hologram to interact with a vehicle passenger. Hologram manager 344 can be part of, or communicate with, a display device capable of displaying a holographic image. For example, the display device can be an artificial reality ("XR") device, smartphone, projector, or any other suitable mobile device with the functionality to generate holographic images. In some implementations, the display device includes a hologram application that generates and controls the displayed hologram. Hologram manager 344 can communicate with the hologram application to configure the displayed hologram.

Implementations of hologram manager 344 can select input modalities for interactions between the passenger and hologram. For example, one or more sensors (e.g., cameras) can capture data of the passenger, interior of the vehicle, exterior of the vehicle, and/or surroundings of the vehicle. Machine learning model(s) 354 can be configured to analyze the captured data. For example, machine learning model(s) 354 can be configured to receive captured data of the passenger in the vehicle and output (e.g., classify) the passenger's state. Example states include, injured, mobile, partially mobile, immobile, pinned, affected by a heart attack, affected by a stroke, affected by paralysis (e.g., full or partial paralysis), asleep, unconscious, dizzy, not looking at the road for a threshold time, and any other suitable passenger state.

Hologram manager 344 can select an input modality for interactions between the hologram and passenger according to the passenger's determined state. Implementations can include mappings between determined states and/or input modalities. Example input modalities include one or more of audio, movement or gesture, gaze, or a combination thereof. An injured state for a passenger may map to a gaze or audio input modality. Because the injury may cause difficulty with movement, the movement or gesture input modality may be excluded from the mapping for an injury. In another example, an "affected by a heart attack" state for a passenger may map to an audio input modality. Because the heart attack may cause difficulty with movement and/or head control, the movement or gesture input modality and gaze input modality may be excluded from this mapping.

Some implementations include a priority when a mapping includes multiple input modalities. For example, hologram manager 344 can configure the hologram to prompt the passenger for a response using a first input modality (e.g., the higher priority input modality) based on a mapping between passenger state and input modality. If no response is received within a given time period, hologram manager 344 can configure the hologram to prompt the passenger for a response using a second input modality (e.g., the lower priority input modality). When a response is received after the prompt for the lower priority input modality, hologram manager 344 can select this modality for interactions between the passenger and the hologram.

Hologram manager 344 can select an input modality according to passenger state (e.g., passenger state to modalities mappings) and other determined context for the passenger. For example, captured data for the passenger can be analyzed by machine learning model(s) 354 to determine context, such as whether the passenger is wearing sunglasses, whether a camera view of the passenger is obstructed, and other context. Some input modalities can be excluded from selection based on this context. For example, the gaze input modality can be excluded when a passenger is wearing sunglasses and/or the gaze input modality and movement/gesture input modality can be excluded when the camera view of the passenger is obstructed.

The movement or gesture input modality and the gaze input modality may be implemented using one or more cameras. For example, machine learning model(s) 354 can be trained and/or configured to receive captured passenger data and track body movement (e.g., hands and fingers) and/or eye movement for a passenger. In an XR environment, tracked body movement can be resolved as a selection of one or more displayed options/objects and/or as identifying elements within the mapped environment of the vehicle (e.g., touching or gesturing at a door can indicate which door is undamaged). Similarly, tracked eye movement can be resolved as selection of one or more displayed options and/or as identifying elements within the mapped environment of the vehicle (e.g., gaze at a door can indicate which door is undamaged).

Implementations of hologram manager 344 can also determine an incident and incident type for the vehicle and passenger. For example, machine learning model(s) 354 (or other suitable models) can analyze sensor data (e.g., camera data, accelerometer data, heart rate data for passengers, audio data, etc.) and predict whether an incident outside normal driving conditions has occurred and classify the predicted incident. Example incident types can include a front crash, a side crash, a rear crash, a high-speed crash, a medium-speed crash, a low-speed crash, normal driving condition, distracted driving condition, weaving driving condition, erratic driving condition, other suitable incident types, or a combination thereof.

Hologram manager 344 configures the hologram with text to present to the vehicle passenger. For example, predetermined text and/or a sequence of conversation can be stored for certain incident types. The text/sequence of conversation can be presented to the vehicle passenger when an incident is detected and an incident type is determined. Hologram manager 344 configures the hologram to present the text using the input modality selected for communication between the passenger and hologram.

In some implementations, the hologram is configured to collect condition information from the passenger. For example, the predetermined text and/or sequence of conversation can include questions for the passenger, and the passenger's responses provide the condition information to hologram manager 344. Machine learning model(s) 354 and other suitable natural language processing techniques can process responses from the passenger (e.g., natural language text) to determine the condition information. Example condition information collected can include passenger health or state information (e.g., injury status, mobility status, movement capabilities, pain level, location, attention level, etc.), vehicle information (e.g., damage to vehicle, is vehicle running, is vehicle drivable, door positions, door damage, window positions, window damage, etc.), safety information from surrounding conditions (e.g., in traffic, near a hazardous condition, no immediate danger), or a combination thereof.

Hologram manager 344 can configure the hologram to provide the passenger instructions. Implementations of instruction manager 348 can generate a set of instructions by matching portions of the determined passenger state information, determined incident type, and collected condition information to one or more instruction templates 346. For example, stored instruction templates 346 can have parameters for incident type (e.g., crash type), passenger condition, vehicle condition, surrounding safety conditions, or other suitable conditions. Instruction manager 348 selects instruction templates 346 that match the current incident type, passenger health information, vehicle information, and/or safety information for surrounding conditions.

An instruction templates 346 with parameters (e.g., parameters that represent incident type, passenger condition, vehicle condition, and/or surround safety conditions) can include text and/or a sequence of messages that guide the passenger to safely resolve an issue. For example, after a crash if a vehicle is smoking it may be urgent for a passenger to leave the vehicle to avoid injury. The information sensed by sensor device(s) and/or gathered by the hologram manager (e.g., through interactions with the passenger) can be used to determine that: incident type is crash; passenger impairment is dazed, mobile, and non-injured; vehicle condition is undriveable, smoking, and driver side door damaged; and surrounding conditions are no immediate danger. Instruction manager 348 can match this information to an instruction template with parameters that match: non-injured passenger, smoking vehicle, and after a crash.

The matched instruction template 346 can include instructions for safely leaving a vehicle that is smoking after a crash. Instruction manager 348 generates instructions for the current conditions by applying the sensed/gathered information to the matched instruction template 346. For example, the instruction manager can generate instructions to guide the passenger out of a door that is not the driver side door given the known damage. Implementations of instruction template 346 can use variables within stored instructions and alternative instructions. For example, the matched instruction template 346 in the above example may include a variable for the door, and when instruction manager 348 applies the current conditions the door variable can be resolved (e.g., a non-driver side door, the closest door that is not damaged, etc.).

In another example, alternative instructions can be stored by the matched instruction template 346. For example, a set of instructions can be stored that guide a passenger through a door, however when the vehicle is in certain conditions and/or a window is readily available as an exit, an alternative set of instructions can be stored that guide the passenger through a window. When instruction manager 348 applies the current conditions to the matched instruction template 346, one or more of the alternative sets of instructions can be selected (and variables can be resolved within the set of instructions).

Hologram manager 344 can configure the hologram to guide the passenger using the set of instructions from instruction manager 348. For example, a hologram displayed in augmented reality can move to/appear at elements of the vehicle to guide the passenger through the instructions (e.g., move to the exit door that the passenger is instructed to use). The hologram manager 344 can also generate audio instructions (e.g., language) that guide the passenger.

Implementations of hologram manager 344 may determine that an intervention action should be performed based on portions of the determined passenger state information, determined incident type, and/or collected condition information (e.g., current conditions). The intervention action can be performed by an additional device (e.g., the vehicle, a controller within the vehicle, or any other suitable device). Additional device controller 350 can communicate with additional devices and provide instructions to cause intervention actions (e.g., movement of vehicle doors, windows, and/or trunk, operation of vehicle when driving, trigger the release of a substance or sound to wake a passenger from unconsciousness, etc.) Additional device controller 350 can connect to additional devices (e.g., the vehicle) using any suitable wired or wireless link and communicate instruction messages using any suitable protocol, format, or message type.

Intervention rules 352 define rules for determining when to take intervention action and selecting what action should be performed. An example intervention rule definition includes: IF passenger is pinned AND passenger's neck is non-injured AND passenger is in a front seat AND (vehicle conditions OR surrounding conditions cause immediate danger), THEN move occupied seat to release passenger. Hologram manager 344 may compare current conditions (e.g., portions of the determined passenger state information, determined incident type, and collected condition information) to intervention rules 352 to determine intervention actions.

In an example, current conditions may reflect that the passenger is pinned after the crash in the driver-side seat and the vehicle is smoking. These current conditions can be compared to intervention rules 352 by implementing the logic of a rule using the data values of the current conditions. In the above example of intervention rules 352, when hologram manger 344 compares the example current conditions to the example of intervention rules 352, the rule evaluates to true and hologram manager 344 can determine that the intervention action should be performed. Implementations may interact with the passenger using the hologram (and selected input modality) to request permission to perform the intervention action (e.g., move the driver seat). When the passenger gives permission, additional device controller 350 can transmit an instruction to the vehicle, a seat controller, or any other suitable device capable of moving the driver seat based on electronic instruction.

Another example intervention rules 352 definition includes: IF (passenger is pinned OR passenger is immobile) AND interior of vehicle is smoking THEN open vehicle window. Hologram manager 344 can apply current conditions to the example rule and, when the rule evaluates to true, hologram manager 344 can determine that a vehicle window should be opened. Based on the determination, additional device controller 350 can transmit an instruction to the vehicle, a window controller, or any other suitable device capable of opening vehicle windows based on electronic instruction.

Implementations of hologram manager 344 can mix providing instructions and performing intervention actions. In an example of a pinned driver in the driver-side seat, the instruction manager 348 can select instruction templates 346 and apply the current information to generate instructions for the passenger to resolve the pinned status. For example, a matched instruction template 346 can include a list of options for freeing the passenger, such as remove your seatbelt, move your seat, move the steering wheel, check clothing items to ensure they are not restricting movement, and other suitable options. Hologram manager 344 can configure the hologram to interact with the passenger to guide the passenger through these options. An example intervention rule 352 may define that intervention action (e.g., moving the driver-side seat) should be performed after instruction, as it would be preferred for the passenger be freed without intervention action. When the passenger has complied with the instructions provided by the hologram without the passenger being freed, the example intervention rule 352 may evaluate to true and hologram manager 344 can determine that an intervention action (e.g., moving the driver-side seat) should be performed. Additional device controller 350 can then transmit an instruction to the vehicle, a seat controller, or any other suitable device capable of moving the driver-side seat based on electronic instruction.

Machine learning model(s) 354 can be a set of models used to process data (e.g., sensor data, natural language data, etc.), resolve current conditions, classify states (e.g., a passenger state, a vehicle state), or perform any other suitable analytics. For example, machine learning model(s) 354 can be configured/trained to analyze (e.g., takes as input) captured camera data (e.g., images) of a vehicle passenger (e.g., driver) and classify the state of the passenger. Example classification states include, injured, mobile, partially mobile, immobile, pinned, affected by a heart attack, affected by a stroke, affected by paralysis (e.g., full or partial paralysis), asleep, unconsciousness, dizzy, not paying attention to the road, and any other suitable passenger state. The example model can be a convolutional neural network configured to perform computer vision classification functions.

Another example of machine learning model(s) 354 can be configured/trained to analyze sensor data (e.g., camera data, accelerometer data, heart rate data for passengers, audio data, etc.) and predict whether an incident outside normal driving conditions has occurred and classify the predicted incident. Example incident type classifications can include a front crash, a side crash, a rear crash, a high-speed crash, a medium-speed crash, a low-speed crash, normal driving condition, distracted driving condition, weaving driving condition, erratic driving condition, other suitable incident type, or a combination thereof. Some implementations of this example model use an ensemble learning model. For example, sensor data that includes images (e.g., camera data) can be analyzed by a convolutional neural network or other computer vision machine learning component. Other sensor data (e.g., accelerometer data, heart rate data, transcribed language data) can be analyzed by other suitable machine learning components (e.g., recurrent neural network, support vector machines, decision trees, Parzen windows, Bayes, clustering, reinforcement learning, probability distributions, decision trees, decision tree forests, etc.) The output from these various machine learning components can then be combined (e.g., with fully connected layers or any other suitable combination technique).

Another example model of machine learning model(s) 354 can be configured/trained to analyze and understand natural language data (e.g., received form the passenger) to resolve data values for current conditions, condition information, state information, or other context information. For example, a sensor device (e.g., microphone) can receive audio data from a passenger that includes natural language text. An application, model, or other suitable software can transcribe the natural language text from the audio data. This example of model of machine learning model(s) 354 can analyze the transcribed natural language and understand/resolve data values of interest from the natural language data.

A "machine learning model," as used herein, refers to a construct that is trained/configured using training data or a data corpus to make predictions or provide probabilities for data items, such as data items that were not included in the training data. For example, training data for supervised learning can include items with various parameters and an assigned classification or prediction value. A new data item can have parameters that a model can use to assign a classification to the new data item or predict/understand a data value. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model(s) can be a neural network with multiple input nodes that receive sensor data related to passenger(s), vehicles, and vehicle surroundings. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce value(s) based on the input that, once the model is trained, can be used to generate classifications (e.g., passenger state classifications, incident classifications, data category classifications) and/or resolve data values (e.g., understand natural language text to resolve data values for pieces of information). In some implementations, such neural networks, known as deep neural networks, can have multiple layers of intermediate nodes with different configurations, can be a combination of models that receive different parts of the input and/or input from other parts of the deep neural network, or are convolutions or recurrent-partially using output from previous iterations of applying the model as further input to produce results for the current input.

Machine learning model(s) can be trained with supervised learning, where example training data can include sensor data with classification labels (e.g., passenger/vehicle images and corresponding sensor data values with classification labels, incident images and corresponding sensor data values with classification labels, etc.) and/or natural language data (e.g., with resolved data value labels). This example data can be provided to the machine learning model(s) as input and desired output. During training, output from the model for a training instance can be compared to the desired output for that instance (e.g., labels) and, based on the comparison, the model can be modified, such as by changing weights between nodes of the neural network or parameters of the functions used at each node in the neural network (e.g., applying a loss function). After applying the examples in the training data and modifying the model(s) in this manner, the model(s) can be trained to generate classifications (e.g., passenger state classifications, incident classifications, data category classifications) and/or resolve data values (e.g., understand natural language text to resolve data values for pieces of information).

Figure 4A:
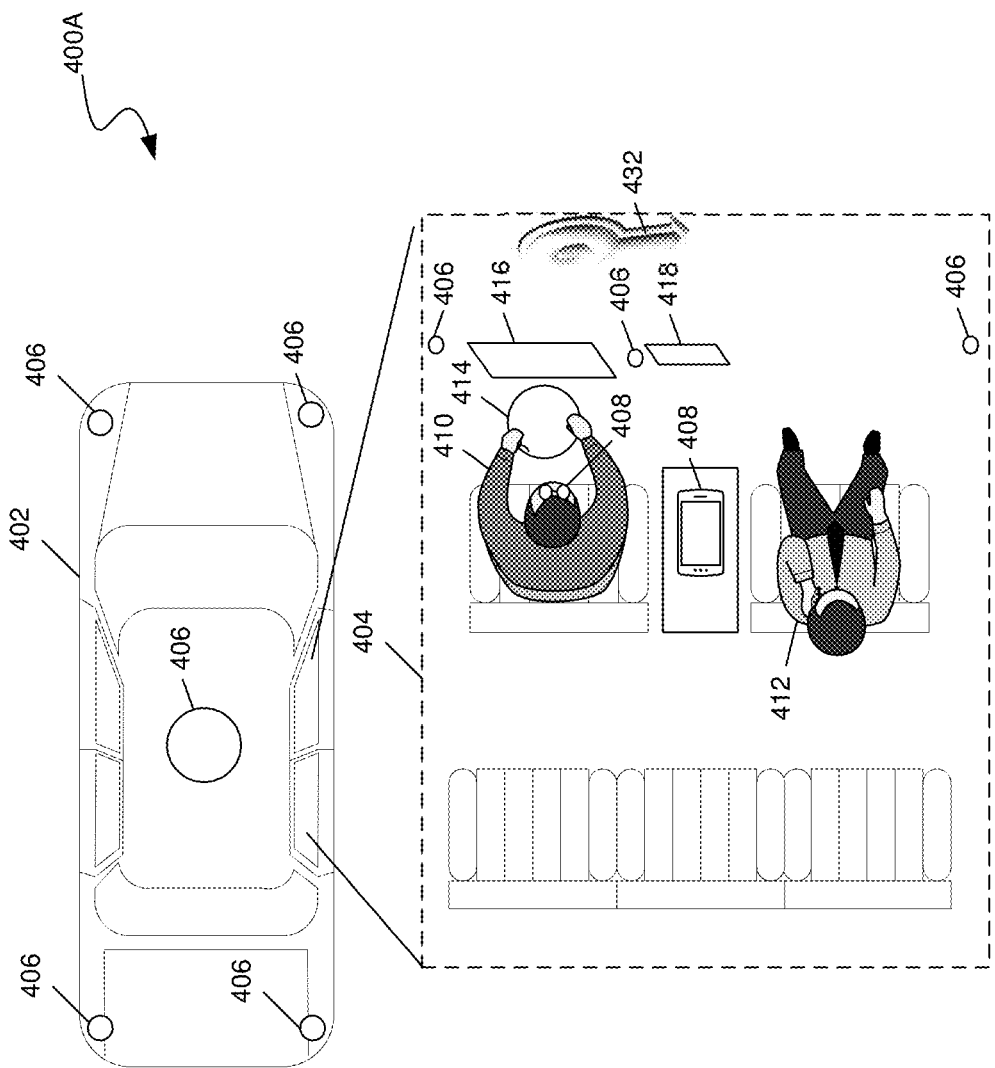
FIGS. 4A and 4B are conceptual diagrams illustrating vehicle scenarios for hologram interactions.
Figure 4B:
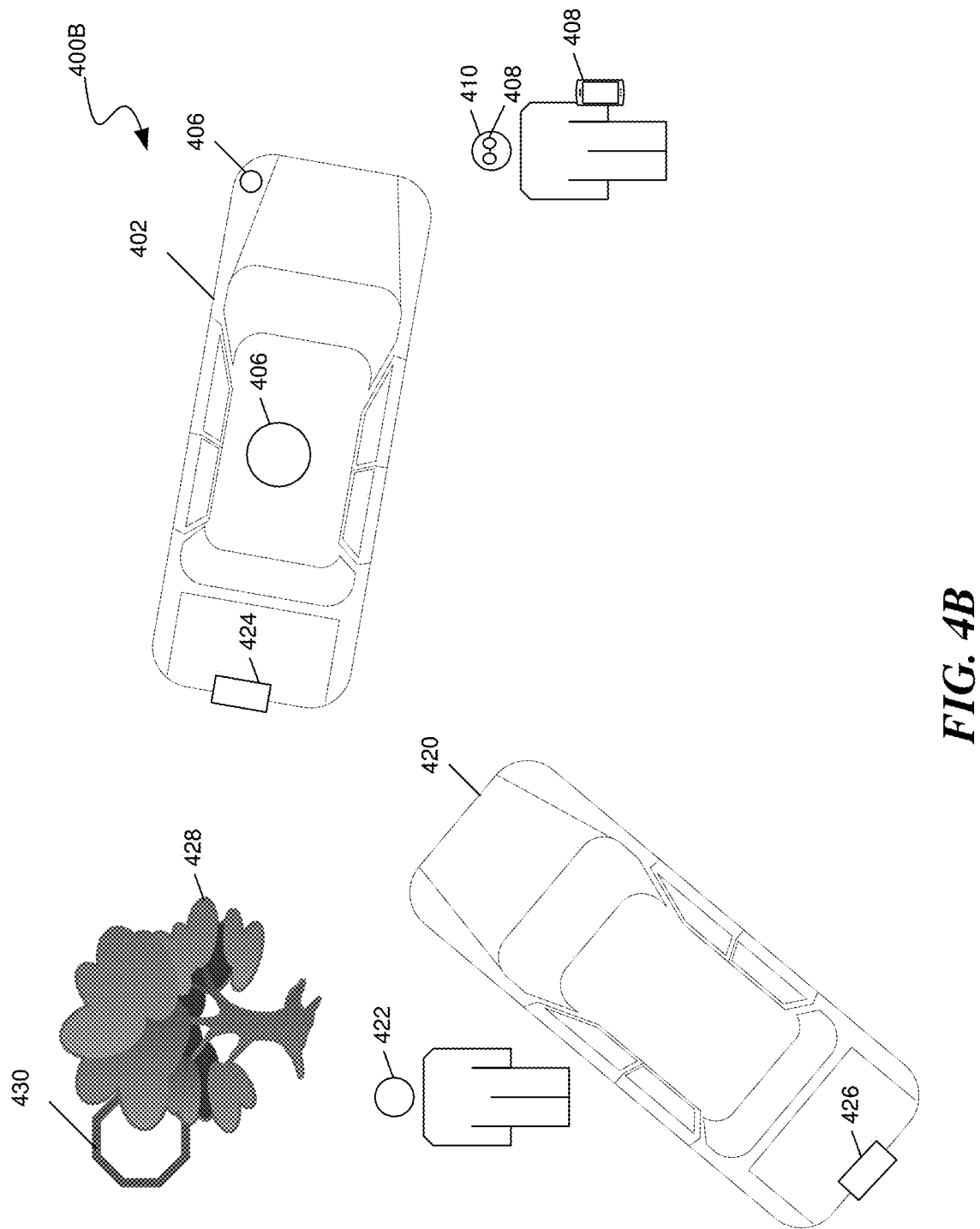

FIGS. 4A and 4B are conceptual diagrams illustrating vehicle scenarios for hologram interactions. Diagrams 400A and 400B includes vehicles 402 and 420, vehicle interior 404, sensors 406, client devices 408, passengers 410 and 412, steering wheel 414, panel 416, console 418, third-party 422, license plates 424 and 426, obstruction 428, road sign 430, and hologram 432. Sensors 406 can be located at various locations on vehicle 402. Sensors 406 can include accelerometers, cameras (e.g., optical, infrared, etc.) microphones, and other suitable sensors.

Some implementations map vehicle interior 404 using sensors 406 and a volumetric or three-dimensional scanning software application. For example, sensed data from two or more sensors 406 that are cameras can be combined by the scanning software to resolve a three-dimensional mapping of the environment within vehicle interior 404. Some implementations can also map an area outside of vehicle 402 with two or more sensors 406. Any suitable three-dimensional scanning software or volumetric scanning software can be implemented.

Client device(s) 408 can include smartphones, tablets, XR devices, wearable devices, and any other suitable client device. Diagram 400A depicts client device(s) 408 as a smartphone (located between the front seats) and a wearable XR device (worn by passenger 410). Passenger 410 is the driver, and such can operate steering wheel 414 to drive vehicle 402. Panel 416 can be an instrument panel and console 418 can be an entertainment console. In the illustrated example, client device(s) 408, panel 416, and console 418 can be display devices capable of displaying a hologram. In some implementations, the XR device 408 worn by the user or another projection device can cause the user to see hologram 432 (e.g., by projecting light into the environment or into the driver's eyes). For example, these devices may include a projector, XR display, or other suitable display device that can generate a three-dimensional holographic display 432 (e.g., display of an avatar, simulated person, driving interfaces for alternate input modality driving controls, instructions for a passenger to take a driving action, recommendations following an identification of an unsafe condition, and the like). Any other suitable devices capable of displaying a hologram can be implemented. For example, hologram 432, created by XR device 408 projecting light into the driver 410's eyes, can include an interface that the driver 410 can control with his eye gaze direction, to steer the vehicle following an identification that the driver 410 has lost full control of his arms.

Implementations analyze data from sensors 406 using machine learning model(s) to classify states for passenger 410 and/or vehicle 402. For example, passenger 410 (e.g., the driver) may be incapacitated and the operation of vehicle 402 may be impacted by this. These states can be classified by the machine learning models and client device(s) 408, panel 416, and/or console 418 may be configured to display a hologram to interact with passenger 410 and/or passenger 412 (which in turn can cause further instructions to be provided to the passengers, provide an interface for vehicle controls, provide automatic vehicle controls, etc.)

For example, a hologram manager can determine that driver 412 is suffering from a health issue (e.g., heart attack, stroke, seizure, etc.) and that vehicle 402 is driving erratically. The hologram manager can configure hologram 432 displayed by a display device (e.g., client device(s) 408, panel 416, and/or console 418) to interact with passengers 410 and 412 to aid the situation. In an implementation, the display device can include a speaker, and the hologram manager can instruct the display device to emit audio that indicates the danger (e.g., repeat the phrase driver incapacitated). In response to the audio, passenger 412 may take control of vehicle 402. In another example, an additional device manager may instruct vehicle 402 to safely stop and the hologram manager can configure the hologram to explain the intervention to passengers 410 and 412 (e.g., the car is stopping or automatically pulling to the side of the road to resolve a dangerous situation).

In another example, diagram 400 may depict a scenario after a crash incident. In this example, the classified states for passenger 410 and/or vehicle 402 can be used to generate instructions and/or implement intervention actions. The hologram manager can configure the displayed hologram 432 to guide the passenger through the instructions or intervention actions. For example, in an XR environment the hologram can be configured to move to an object in the instruction being provided (e.g., vacate the vehicle through this door). In another example, the hologram can be configured to point to the object in the instruction being provided (or otherwise identify the object using a display movement).

Diagram 400B depicts an example scenario after a crash incident. Vehicles 402 and 420 may have been involved in a collision. Passenger 410 (e.g., the driver from diagram 400A) may have exited vehicle 402 using instructions provided by a displayed hologram (e.g., displayed using client device(s) 408). Third-party 422 may have been the driver of vehicle 420. A hologram manager may further instruct passenger 410 to move about the crash site and document portions using client device(s) 408 (e.g., capture images or video). For example, an instruction manager can generate instructions for documenting the crash site by selecting instruction templates that correspond to the crash type (e.g., rear crash at low speed) and applying current conditions to the instruction templates to resolve data values. The hologram manager can configure the displayed hologram to guide passenger 410 around the crash site and indicate crash site areas to photograph. For example, the instructions can define that the crash site areas to document include license plates 424 and 426, vehicle 402, specific portions of the rear of vehicle 402 that show damage, vehicle 420, specific portions of the front of vehicle 420 that show damage, a condition for third-party 422 (e.g., the other person in the accident), road conditions that impact the accident, such as road sign 430 and obstruction 428, and other suitable site areas.

Implementations of the hologram manager can configure the displayed hologram to move to the crash site areas included in the instructions and gesture/visually indicate particular elements to photograph (e.g., in an XR environment, "touch" the rear of vehicle 402). In another example, hologram manager can configure the displayed hologram to point to or otherwise visually indicate crash site elements to photograph.

Some implementations can use computer vision to identify third-party 422 and search one or more databases for information about the identity. For example, criminal databases can be searched and, when a match is found, the hologram manager can configure the hologram to instruct passenger 410 to avoid third-party 422 and/or stay in vehicle 402 until additional parties arrive at the crash site (e.g., law enforcement).

In some scenarios, third-party 422 may be injured and require assistance, such as cardiac resuscitation ("CPR"). The hologram manager can configure the displayed hologram to assist passenger 410 in performing CPR on third-party 422. For example, the hologram can be configured to identify specific portions of the body of third-party 422 and communicate instructions on how to physically perform the CPR (e.g., "press down firmly here with 10-20 pumps"). In another example, an injury to third-party 422 and/or passenger 410 may be dangerous given certain movements or motions. One or more machine learning model(s) can classify an injury for third-party 422 and/or passenger 410, and the hologram manager can configure the hologram to provide instructions according to the classified injury. In an example, the hologram manager can configure the hologram to instruct third-party 422 and/or passenger 410 to lay flat and not move when an injury is classified as a neck injury.

Figure 5:
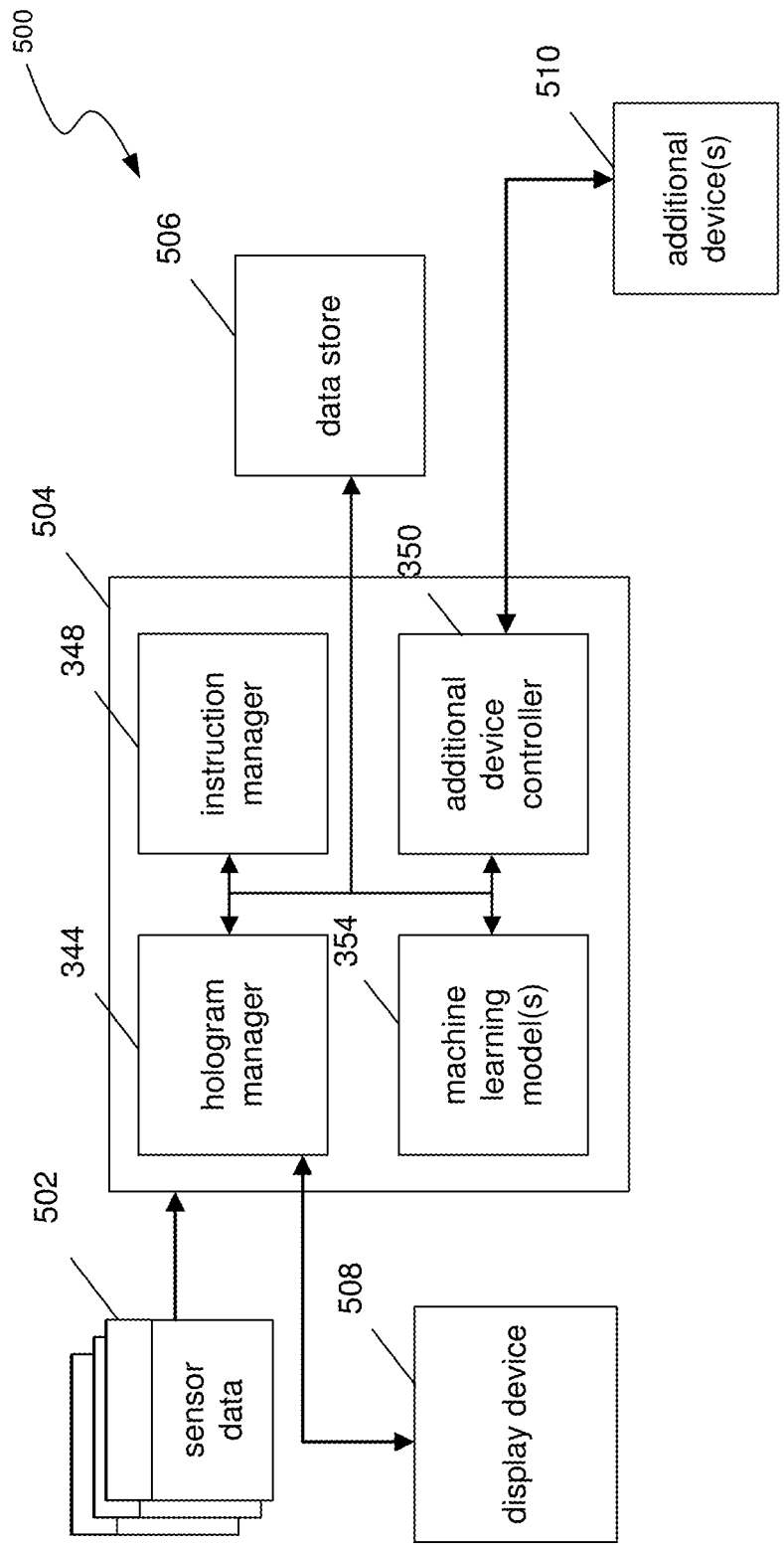
FIG. 5 is system diagram illustrating components for hologram interactions with a vehicle passenger.

FIG. 5 is system diagram illustrating components for hologram interactions with a vehicle passenger. System 500 includes sensor data 502, computing device(s) 504, data store 506, display device 508, additional device(s) 510, hologram manager 344, instruction manager 348, additional device controller 350, and machine learning model(s) 354.

Hologram manager 344 configures a hologram to interact with a vehicle passenger. Hologram manager 344 can be part of, or communicate with, display device 508, or a device capable of displaying a holographic image. For example, display device 508 can be an artificial reality ("XR") device, smartphone, projector, or any other suitable device with the functionality to generate holographic images.

Implementations of hologram manager 344 can select input modalities for interactions between the passenger and hologram. For example, one or more sensors (e.g., cameras, microphones, accelerometers, etc.) can capture sensor data 502 of the passenger, interior of the vehicle, exterior of the vehicle, and/or surroundings of the vehicle. Machine learning model(s) 354 can be configured to analyze the captured data. For example, machine learning model(s) 354 can be configured to receive captured data of the passenger in the vehicle and output (e.g., classify) the passenger's state, an incident and incident type, an operating condition for the vehicle, and/or other suitable classifications.

Hologram manager 344 can select a modality for interactions between the hologram and passenger according to the passenger's determined state. Implementations can include mappings between determined states and/or input modalities. Example modalities include one or more of audio, movement or gesture, gaze, or a combination thereof. Hologram manager 344 configures the hologram with natural language to present to the vehicle passenger. For example, predetermined text and/or a sequence of conversation can be stored at data store 506 for certain incident types. The text/sequence of conversation can be presented to the vehicle passenger when an incident is detected and an incident type is determined. Hologram manager 344 configures natural language into the selected in relation to the hologram.

In some implementations, the hologram manager is configured to collect condition information from the passenger. For example, the predetermined text and/or sequence of conversation can include questions for the passenger, and the passenger's responses provide the condition information to hologram manager 344. Machine learning model(s) 354 and other suitable natural language processing techniques can process responses from the passenger (e.g., natural language text) to determine the condition information.

Hologram manager 344 can configure the hologram to provide the passenger instructions. Implementations of instruction manager 348 can generate a set of instructions by matching portions of the determined passenger state information, determined incident type, and collected condition information to one or more instruction templates stored at data store 506. For example, stored instruction templates can have parameters for incident type (e.g., crash type), passenger condition, vehicle condition, surrounding safety conditions, or other suitable conditions. Instruction manager 348 selects instruction templates that match the current incident type, passenger health information, vehicle information, and/or safety information for surrounding conditions.

Instruction manager 348 can generate a set of instructions for the current conditions by applying sensed/gathered information to the matched instruction template. Hologram manager 344 can configure the hologram to guide the passenger using instructions from instruction manager 348. For example, a hologram displayed by display device 508 in artificial reality can move to/appear at elements of the vehicle to guide the passenger through the instructions (e.g., move to the exit door that the passenger is instructed to use). The display device 508 can also generate audio instructions (e.g., language) that guide the passenger.

Implementations of hologram manager 344 may determine that an intervention action should be performed based on portions of the determined passenger state information, determined incident type, and collected condition information (e.g., current conditions). The intervention action can be performed by additional device(s) 510 (e.g., the vehicle, a controller within the vehicle, or any other suitable device). Hologram manager 344 may compare current conditions (e.g., portions of the determined passenger state information, determined incident type, and collected condition information) to intervention rules stored at data store 506 to determine/cause intervention actions.

Additional device controller 350 can communicate with additional device(s) 510 and provide instructions to cause intervention actions (e.g., movement of vehicle doors, windows, and/or trunk, operation of vehicle when driving, etc.) Additional device controller 350 can connect to additional devices 510 using any suitable wired or wireless link and communicate instruction messages using any suitable protocol, format, or message type.

Those skilled in the art will appreciate that the components illustrated in FIGS. 1-3, 4A, 4B, and 5 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 6:
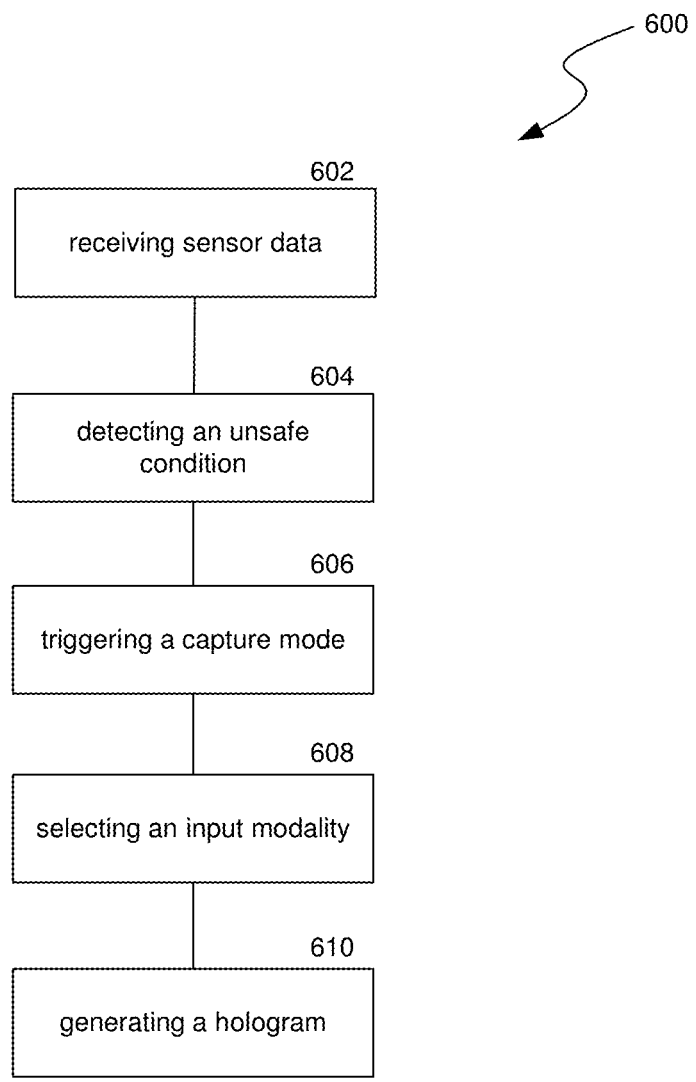
FIG. 6 is a flow diagram illustrating a process used in some implementations for selecting an input modality for interacting with a generated hologram.

FIG. 6 is a flow diagram illustrating a process used in some implementations for selecting an input modality for interacting with a generated hologram. In some implementations, process 600 can be performed during operation of a vehicle and/or after an incident (e.g., vehicle crash), e.g., as a process on an artificial reality device or mobile in response to detecting that the user is driving, as part of a vehicle's systems when in operation, or in response to a user command. Process 600 can be performed by one or more computing devices in combination with one or more sensors (e.g., cameras, accelerometers, microphones, etc.).

At block 602, process 600 receives sensor data, from one or more sensing devices, representative of the vehicle's condition and/or a condition of a passenger of the vehicle.

Example sensor devices include cameras, microphones, accelerometers, and any other suitable sensors. The sensors can capture data during operation of the vehicle and/or after a vehicle incident (e.g., crash). At block 604, process 600 detects an unsafe condition based on the sensor data. For example, one or more machine learning model(s) can be configured/trained to detect and classify an unsafe condition for the vehicle and/or passenger (e.g., an unsafe operating condition, health issue, and the like).

At block 606, process 600 triggers, based on the detected unsafe condition, a capture mode that determines a state of impairment for the passenger. For example, the capture mode can provide sensor data to one or more machine learning model(s) configured/trained to classify a state for a passenger (e.g., driver) of the vehicle. The classified state can include injured, mobile, partially mobile, immobile, pinned, affected by a heart attack, affected by a stroke, affected by paralysis (e.g., full or partial paralysis), asleep, unconscious, dizzy, and other suitable impairment states.

At block 608, process 600 selects at least one input modality according to the determined state of impairment for the passenger. For example, the selected input modality can be used for a user to respond to and interact with a displayed hologram. The selected input modality can match communication capabilities for the determined state of impairment (e.g., using an eye-based control when the user's hands are determined to be impaired). Implementations can include mappings between determined states and/or input modalities. Example input modalities include one or more of audio/voice, movement or gesture, gaze, or a combination thereof.

An injured state for a passenger may map to a gaze or audio input modality. Because the injury may cause difficulty with movement, the movement or gesture input modality may be excluded from the mapping for an injury. In another example, an affected by a heart attack state for a passenger may map to an audio input modality. Because the heart attack may cause difficulty with movement and/or head control, the movement or gesture input modality and gaze input modality may be excluded from this instance in the mapping. Implementations select the input modality for a display device configured to display a hologram.

At block 610, process 600 generates, using a display device, the hologram. Input can be received from the passenger based on the selected input modality and the generated hologram can be controlled based on the input. In some implementations, the hologram can be generated using a display device that includes a projector, XR display, and/or screen capable of displaying a holographic image.

Figure 7:
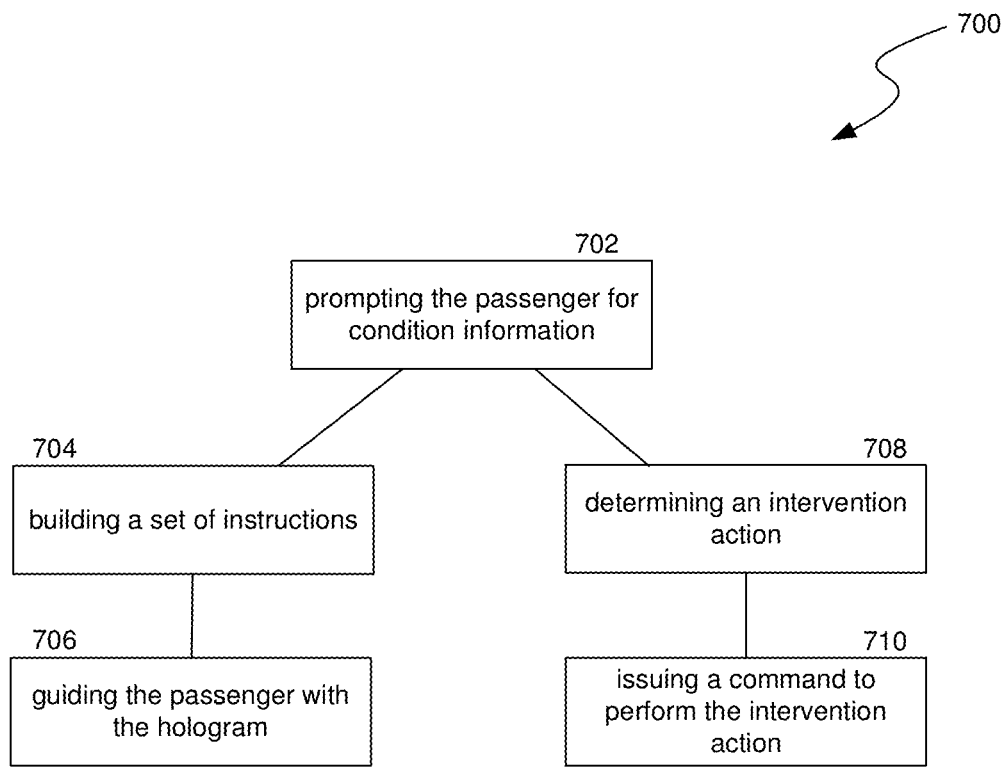
FIG. 7 is a flow diagram illustrating a process used in some implementations for performing instructions and/or interventions using a hologram.

FIG. 7 is a flow diagram illustrating a process used in some implementations for performing instructions and/or interventions using a hologram. In some implementations, process 700 can be performed during operation of a vehicle and/or after an incident (e.g., vehicle crash) e.g., as a process on an artificial reality device or mobile in response to detecting that the user is driving, as part of a vehicle's systems when in operation, or in response to a user command. Process 700 can be performed by one or more computing devices in combination with one or more sensors. An input modality can be selected by process 600 of FIG. 6, and process 700 can use this selected input modality for interactions between the passenger and the hologram.

At block 702, process 700 prompts the passenger for condition information. For example, input representing the condition information (e.g., natural language data) can be sensed from the passenger using the selected input modality. Example condition information includes passenger health information (e.g., injury status, mobility status, movement capabilities, pain level, location, etc.), vehicle information (e.g., damage to vehicle, is vehicle running, is vehicle drivable, door positions, door damage, window positions, window damage, etc.), safety information from surrounding conditions (e.g., in traffic, near a hazardous condition, no immediate danger), or a combination thereof.

In some implementations, the input modality selected for interaction between the passenger and hologram is an audio modality, and the condition information is sensed as natural language data. One or more machine learning models and/or other natural language processing techniques can be used to analyze the natural language data and determine pieces of condition information.

Once condition information is determined, process 700 can progress to block 704 and/or 708. For example, process 700 can first progress to block 704 and 706, and second progress to blocks 708 and 710. In another example, process 700 can first progress to blocks 708 and 710, and second progress to blocks 704 and 706. In yet another example, process 700 can progress to blocks A) 704 and 706 and B) 708 and 710 concurrently.

At block 704, process 700 builds a set of instructions for the passenger using one or more of the sensor data, the state of impairment for the passenger, the condition information, or a combination thereof. The set of instructions can be built using a plurality of instruction templates for incident types, injury types, danger types from surrounding conditions, or a combination thereof.

An instruction manager can generate the set of instructions for the passenger in some implementations. For example, stored instruction templates can have parameters for incident type (e.g., crash type), passenger condition, vehicle condition, surrounding safety conditions, or other suitable conditions. The instruction manager can select instruction templates that match the current incident type, passenger health information, vehicle information, and/or safety information for surrounding conditions. In some implementations, the instruction manager can generate the set of instructions for the current conditions by applying the sensed/gathered information to the instruction template. For example, the instruction manager can generate instructions to guide the passenger out an undamaged door given the known condition of the vehicle.

At block 706, process 700 provides the set of instructions to the passenger using the hologram. For example, the passenger can be guided to implement one or more of the instructions by displayed portions of the hologram and/or audio generated by the display device.

At block 708, process 700 determines an intervention action. For example, based on the state of impairment for the passenger, the sensor data representative of the vehicles condition, and the passenger input comprising the condition information, an intervention action can be determined. Intervention rules can define rules for determining when to take intervention actions and selecting what action should be performed. Current conditions (e.g., portions of the determined passenger state information, determined incident type, and collected condition information) can be compared to intervention rules to determine intervention actions (e.g., movement of vehicle doors, windows, and/or trunk, operation of vehicle when driving, etc.)

At block 710, process 700 issues a command to the vehicle to execute the intervention action. The intervention action can be performed by an additional device (e.g., the vehicle, a controller within the vehicle, or any other suitable device). For example, the issued command causes movement of one or more elements of the vehicle to alleviate a safety issue.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for selecting an input modality for interacting with a generated hologram in a vehicle, the method comprising:
    receiving sensor data, from one or more sensing devices, representative of at least one of a vehicle's condition or a condition of a passenger of the vehicle;
    detecting, by analyzing the sensor data using one or more machine learning models, a condition comprising one or more of a vehicle crash or impairment of the passenger;
    triggering, based on the detected condition, a capture mode that determines a state of impairment for the passenger;
    selecting at least one input modality for interacting with the passenger using at least a mapping that maps a set of input modalities to states of impairment,
        wherein the input modality is selected for a display device configured to display a hologram,
        wherein the selected input modality comprises one or more of audio, movement, gesture, or gaze,
        wherein the mapping maps at least a portion of the states of impairment to a limited subset of the set of input modalities, and
        wherein the limited subset of the set of input modalities excludes at least another portion of the set of input modalities;
    building a set of instructions for the passenger using one or more of the sensor data or the state of impairment for the passenger;
    displaying, using the display device, the hologram; and
    controlling, based on input received from the passenger via the selected input modality, the displayed hologram, wherein the controlling guides the passenger, via the hologram, through the set of instructions, and the set of instructions are configured to guide the passenger to safety or to alleviate danger to the passenger related to the detected condition.

2. The method of claim 1, wherein the mapping defines that one or more of a gaze input modality or the audio input modality are selected when the state of impairment comprises at least one of a limited mobility state or an injured state.

3. The method of claim 1, further comprising:
    prompting the passenger to provide input using the selected input modality; and
    after a wait period, prompting the passenger to provide input using a different input modality, where the different input modality is selected for further interaction when the passenger provides input using the different modality.

4. The method of claim 1, further comprising:
prompting an input from the passenger for condition information, wherein the input comprising the condition information is sensed from the passenger using the selected input modality, and the condition information comprises one or more of passenger health information, vehicle information, or safety information from surrounding conditions;
  wherein the set of instructions for the passenger is built using a) one or more of the sensor data or the state of impairment for the passenger, and b) the condition information,
  wherein the set of instructions is built using a plurality of instruction templates that comprise parameters, and
  wherein the instruction templates used to build the set of instructions comprise parameters that match one or more of the sensor data, the state of impairment for the passenger, or the condition information.

5. The method of claim 4, wherein:
each instruction template comprises a predetermined priority; and
building the set of instructions further comprises ordering instructions within the set of instructions using the predetermined priorities.

6. The method of claim 1, further comprising:
prompting an input from the passenger for condition information, wherein the input comprising the condition information is sensed from the passenger using the selected input modality, and the condition information comprises one or more of passenger health information, vehicle information, or safety information from surrounding conditions; and
issuing a command to the vehicle based on the state of impairment for the passenger, the sensor data representative of the vehicles condition, and the passenger input comprising the condition information, wherein the command to the vehicle causes movement of one or more elements of the vehicle to alleviate a safety issue.

7. The method of claim 6, wherein the movement of the one or more elements of the vehicle comprises at least one of movement of a seat, movement of a window, movement of a steering wheel, opening of a door, or opening of a trunk.

8. The method of claim 1, wherein the input modality selected via the mapping comprises a first input modality comprising a first priority and a second input modality comprising a second priority.

9. The method of claim 8, further comprising:
prompting the passenger to provide input using the first input modality; and
after a wait period, prompting the passenger to provide input using the second input modality, wherein the second input modality is selected for further interaction when the passenger provides input using the second input modality.

10. The method of claim 1, wherein the set of instructions is built using a plurality of instruction templates that comprise parameters, and the instruction templates used to build the set of instructions comprise parameters that match one or more of the sensor data or the state of impairment for the passenger.

11. A non-transitory computer-readable storage medium storing instructions that, when executed by a computer, cause the computer to perform a process for interacting with a generated hologram in a vehicle, the process comprising:
receiving sensor data, from one or more sensing devices, representative of at least one of vehicle's condition or a condition of a passenger of the vehicle;
detecting, by analyzing the sensor data using one or more machine learning models, a condition comprising one or more of a vehicle crash or impairment of the passenger;
triggering, based on the detected condition, a capture mode that determines a state of impairment for the passenger;
selecting at least one input modality for interacting with the passenger using at least a mapping that maps a set of input modalities to states of impairment,
  wherein the input modality is selected for a display device configured to display a hologram, and the selected input modality comprises one or more of audio, movement, gesture, or gaze,
  wherein the mapping maps at least a portion of the states of impairment to a limited subset of the set of input modalities, and
  wherein the limited subset of the set of input modalities excludes at least another portion of the set of input modalities;
building a set of instructions for the passenger using one or more of the sensor data or the state of impairment for the passenger;
displaying, using the display device, the hologram; and
controlling, based on the input received from the passenger via the selected input modality, the displayed hologram, wherein the controlling guides the passenger, via the hologram, through the set of instructions, and the set of instructions are configured to guide the passenger to safety or to alleviate danger to the passenger related to the detected condition.

12. The computer-readable storage medium of claim 11, wherein the mapping defines that one or more of the gaze input modality or the audio input modality are selected when the state of impairment comprises a limited mobility state or an injured state.

13. The computer-readable storage medium of claim 11, wherein the process further comprises:
prompting the passenger to provide input using the selected input modality; and
after a wait period, prompting the passenger to provide input using a different input modality, where the different input modality is selected for further interaction when the passenger provides input using the different modality.

14. The computer-readable storage medium of claim 11, wherein the process further comprises:
prompting an input from the passenger for condition information, wherein the input comprising the condition information is sensed from the passenger using the selected input modality, and the condition information comprises one or more of passenger health information, vehicle information, or safety information from surrounding conditions;
  wherein the set of instructions for the passenger is built using a) one or more of the sensor data or the state of impairment for the passenger, and b) the condition information,
  wherein the set of instructions is built using a plurality of instruction templates that comprise parameters, and wherein the instruction templates used to build the set of instructions comprise parameters that match one or more of the sensor data, the state of impairment for the passenger, or the condition information.

15. The computer-readable storage medium of claim 14, wherein:
   each instruction template comprises a predetermined priority; and
   building the set of instructions further comprises ordering instructions within the set of instructions using the predetermined priorities.

16. The computer-readable storage medium of claim 11, wherein the process further comprises:
   prompting an input from the passenger for condition information, wherein the input comprising the condition information is sensed from the passenger using the selected input modality, and the condition information comprises one or more of passenger health information, vehicle information, or safety information from surrounding conditions; and
   issuing a command to the vehicle based on the state of impairment for the passenger, the sensor data representative of the vehicle's condition, and the passenger input comprising the condition information, wherein the command to the vehicle causes movement of one or more elements of the vehicle to alleviate a safety issue.

17. The computer-readable storage medium of claim 16, wherein the movement of the one or more elements of the vehicle comprises one or more of movement of a seat, movement of a window, movement of a steering wheel, opening of a door, or opening of a trunk.

18. A computing system for interacting with a generated hologram in a vehicle, the computing system comprising:
   one or more processors; and
   one or more memories storing instructions that, when executed by the one or more processors, cause the computing system to perform a process comprising:
      receiving sensor data, from one or more sensing devices, representative of at least one of a vehicle's condition or a condition of a passenger of the vehicle;
      detecting, by analyzing the sensor data using one or more machine learning models, a condition comprising one or more of a vehicle crash or impairment of the passenger;
      triggering, based on the detected condition, a capture mode that determines a state of impairment for the passenger;
      selecting at least one input modality for interacting with the passenger using at least a mapping that maps a set of input modalities to states of impairment,
         wherein the input modality is selected for a display device configured to display a hologram, and the selected input modality comprises one or more of audio, movement, gesture, or gaze,
         wherein the mapping maps at least a portion of the states of impairment to a limited subset of the set of input modalities, and
         wherein the limited subset of the set of input modalities excludes at least another portion of the set of input modalities;
      building a set of instructions for the passenger using one or more of the sensor data or the state of impairment for the passenger;
      displaying, using the display device, the hologram; and
      controlling, based on the input received from the passenger via the selected input modality, the displayed hologram, wherein the controlling guides the passenger, via the hologram, through the set of instructions, and the set of instructions are configured to guide the passenger to safety or to alleviate danger to the passenger related to the detected condition.

19. The computing system of claim 18, wherein instruction templates used to build the set of instructions comprise parameters that match one or more of the sensor data, or the state of impairment for the passenger.

* * * * *